Patented Oct. 3, 1950

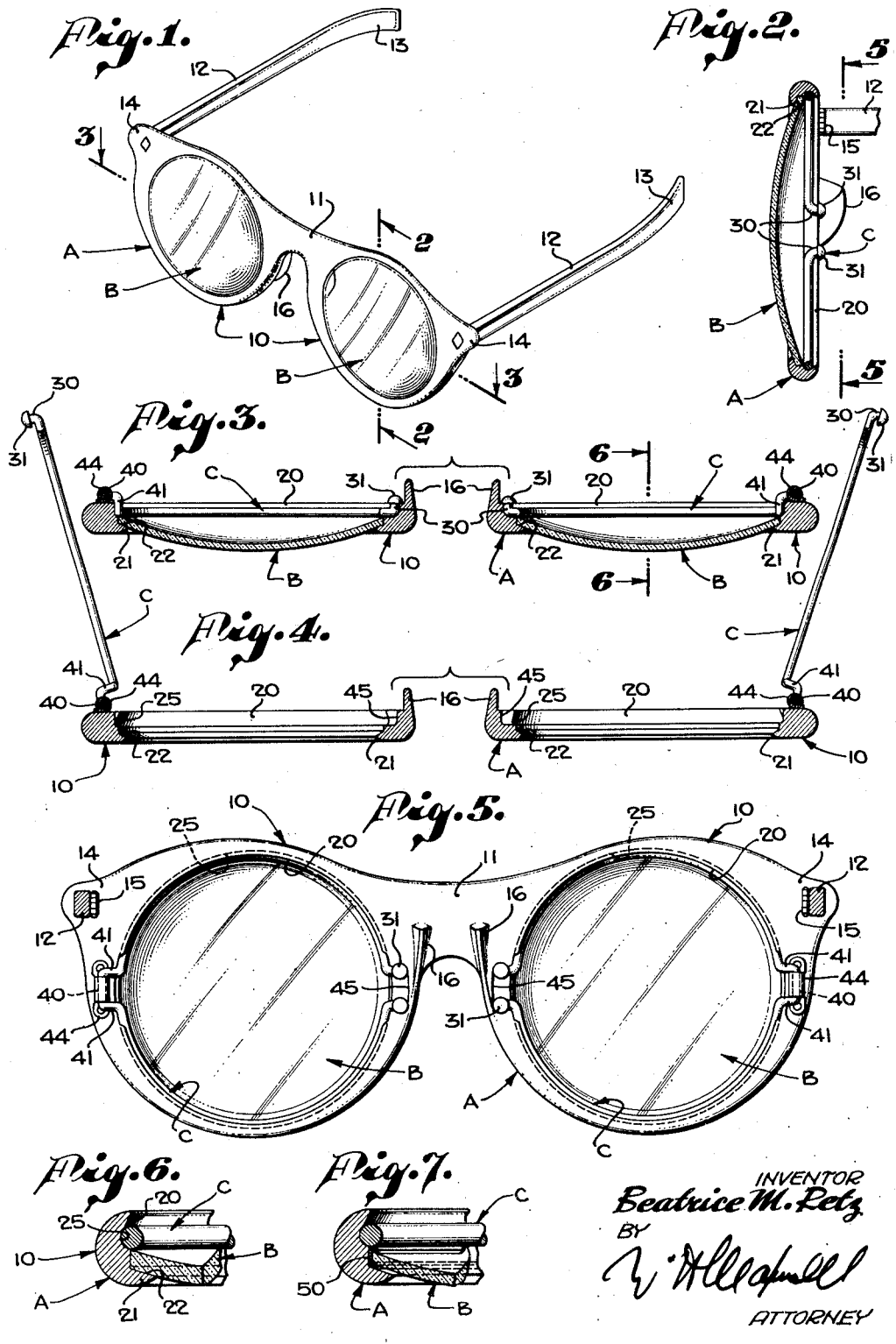

2,524,140

UNITED STATES PATENT OFFICE 2,524,140

CONSTRUCTION FOR SPECTACLES

Beatrice M. Retz, Ventura, Calif.

Application October 16, 1947, Serial No. 780,175

5 Claims. (Cl. 88—41)

This invention relates to a construction for spectacles and it is a general object of the invention to provide a simple, practical inexpensive construction facilitating the interchanging of lenses and frames so that a given set or pair of lenses may be used at will and in any desired frame.

It is highly desirable in the case of spectacles that adequate lens carriers be provided and it is not uncommon that lens frames or carriers be made of rather heavy or sturdy construction. Attempts have been made to render such structures pleasing in appearance through ornamental design or configuration and materials popularly known as plastics are commonly used in such constructions to make them pleasing in appearance. A distinct disadvantage of colored or ornamental constructions of the character referred to is that the lenses desired or required by the user may be in a frame which is of a design or color that is not harmonious or pleasing with other accessories or with the clothing desired to be worn.

It is a general object of this invention to provide spectacles involving lenses and the frame construction whereby the lenses can be easily and quickly mounted in or removed from the frame, making it practical for the user to have several frames of different designs or colors or types so that the lenses can be used in a frame suitable for the circumstances or occasion when the spectacles are to be worn. In the case where costume jewelry is being worn or where clothing of a particular type or color value is employed the wearer can with my construction readily apply the necessary lenses to a frame of a design or color harmonious with such jewelry or with such wearing apparel.

It is a general object of the present invention to provide spectacles involving a frame with lens carrier portions in which the lenses are loosely fitted and are retained in operating position by releasable retainers that are easily operated and which serve to effectively hold the lenses in place during normal use.

Another general object of the present invention is to provide a spectacle construction of the general character referred to wherein the lens retainers are simple inexpensive inconspicuous elements which do not materially complicate the spectacle construction and which add little to the cost thereof.

Another object of the present invention is to provide a spectacle construction of the general character referred to wherein the lens retainers are coupled to the frame preferably hinged thereto so that they cannot become lost or detached.

It is a further object of the present invention to provide a spectacle construction of the general character referred to wherein the parts are so arranged and related that the lens retainers are located at the inner sides of the lens carriers where they are not visible to a person viewing the wearer.

The various objects and features of my invention will be fully understood from the following detailed description of typical preferred form and applications of the invention, throughout which description reference is made to the accompanying drawings, in which:

Fig. 1 is a perspective view of the spectacles embodying the construction of the present invention. Fig. 2 is an enlarged detailed sectional view taken as indicated by line 2—2 on Fig. 1. Fig. 3 is an enlarged detailed plan section taken as indicated by line 3—3 on Fig. 1, showing the retainers holding the lenses in the carriers. Fig. 4 is a view similar to Fig. 3 showing the carriers open and the lenses removed. Fig. 5 is a view of the inner side of the frame being a view taken substantially as indicated by line 5—5 on Fig. 2. Fig. 6 is a detailed sectional view at the edge portion of one of the carriers, being a view taken in the direction indicated by line 6—6 on Fig. 3, and Fig. 7 is a view similar to Fig. 6 showing a modified form of construction wherein the retainer instead of directly engaging the lens engages a rim provided on the lens.

The construction that I have provided involves generally a spectacle frame A, lenses B carried by the frame, and retainer C releasably securing the lenses in the frame.

In accordance with my invention it is contemplated that a user should possess several frames but need have but one pair of lenses. Further, it is contemplated that the several frames be of various designs or of varying ornamental value in which case they may be varied widely in size and configuration and also in material or color or in decoration. In the drawings and for sake of illustrating the principles of my construction I have shown but one rather simple form or design. However, I wish it distinctly understood that I contemplate wide variations from such design.

The frame A may involve essentially a body characterized by two like lens carriers 10 joined by a bridge or nose piece 11 and carrying beams or bows 12 which extend rearwardly and have grips 13 to engage the wearer at or about the ears. In accordance with conventional spectacle construction the upper corner portions of the carriers 10 have projecting lug parts 14 to which the bows 12 are pivotally connected through suitable hinges 15. Further, in accordance with common construction the bridge or nose piece 11 is shown integral with the carriers 10 forming the carriers and the bridge into an integral unit, although in practice it will be obvious that such elements may be separately formed if so desired. Further, in the drawings I have shown suitable nose rests at 16, which parts may be shaped and proportioned in the manner common to ordinary spectacle construction.

Each lens carrier 10 is a substantially ring-like or annular part with a lens opening 20 formed therein, the opening 20 being of such size and shape as to properly accommodate the particular lens to be employed. For purpose of example I have shown lenses which are round, in which case each carrier 10 has a round lens opening 20. In accordance with my invention each carrier 10 is provided at its front or forward end portion with an inwardly projecting flange part 21 having a rearwardly projecting lens shoulder 22. With this construction the lens B is inserted into the carrier from the back or rear end thereof and is entered in the opening 20 until it rests or seats against the shoulder 22, as clearly shown in Fig. 6 of the drawings.

There is a lens retainer C for or in connection with each lens carrier 10, and each lens retainer serves to releasably retain the lens in the retainer. In accordance with my invention each retainer C is a spring type device and may be in the nature of a split spring ring engageable in the lens opening 20 beind the lens. I provide a recess or channel 25 in the wall of the lens opening 20 immediately rearward of the lens B and when the retainer is in place it is seated in and held by this channel. The channel 25 may vary in form and extent, it being preferred ordinarily that it be of such shape and size as to conform substantially to the shape and size of the retainer and it may extend continuously around the wall of the lens opening, as shown throughout the drawings.

The lens retainer C illustrated in the drawings is a simple split spring ring, except that at the ends or where the split occurs it is provided with posts 30 that extend radially of the ring and then axially in a rearward direction, the outer ends of the posts being provided with knobs 31 that can be conveniently engaged by the fingers of the user. The retainer is further varied from the form of a plane simple split ring by being provided at a point preferably diametrically opposite the point of split with a short straight shaft portion 40 supported by arms 41 that project laterally and rearward and then radially to support the shaft portion in position to be rotatably carried by the bearing bracket 44 mounted in the rear side of the frame, as clearly illustrated throughout the drawing.

In forming the split ring type retainer, as above described, it is preferred to proportion the parts so that the ends of the ring where the posts 30 occur are spaced somewhat apart when the ring is seated in the lens carrier, space enough being provided so that as the posts are moved together the ring is contracted enough to be disengaged or dislodged from the carrier. In the particular design illustrated a socket 45 is provided in the carrier from the rear side thereof accommodating the post portions 30 of the retainer. In the preferred arrangement the post portions proper are entirely confined within the socket 40 and only the heads 31 of the posts project from the rear side of the carrier. It is preferred also to locate the sockets 40 so that they occur adjacent the nose rest 16, in which case the brackets 44 are located in the general vicinity of the bows 12 and the retainers hinge out or in the same general direction as the bows, as will be apparent from Fig. 4 of the drawings. It will be understood that in practice the bearing brackets 44 may be simple, small, compact parts that are in no way conspicuous and that by locating the posts 30 and the knobs 31 as described and shown, these parts are in no way visible when the structure is in use.

In carrying out my invention the lenses B used in the structure may vary widely in form and character. For instance they may be simple clear plain lenses having no optical value, or they may be such lenses colored or otherwise characterized to have light filtering qualities, or they may be true lenses of optical value, such as may be required by the user. In the form of the invention illustrated in Figs. 1 to 6 the lenses are of simple or plain form in which case their edge portions are engaged and retained by the retainers C. In Fig. 7 of the drawings I have shown a modified construction wherein the edge portion of each lens is provided with a protective rim 50 of metal or the like which rim is engaged by the retainer thus eliminating danger of marring or chipping.

In using the construction that I have provided the user selects a frame A of the desired design, type, color or style, and in making such selection may give consideration to costume jewelry to be worn, wearing apparel to be used, or other such factors. The lenses to be used, whether they be plain, for light filtering, or for optical effect, are arranged in the openings 20 of the carriers 10 while the retainers are swung out or in open position, as shown in Fig. 4 of the drawings. With the lenses seated against the shoulders 22 the retainers are swung in from the position shown in Fig. 4 to that shown in Fig. 3, and in order to bring them to this operating position the knobs 31 are engaged and moved together or toward each other enough to allow the containers to enter the openings 20 and seat in the recesses 25. The retainers being formed of spring wire or the like preferably round in cross section normally tend to bear outwardly in the retainers and are thus maintained in firm seated engagement in the recesses 25 in which position they serve to effectively retain the lenses against the shoulders 22. With the lenses thus mounted the spectacles can be used in the manner of any ordinary spectacles. However, whenever the user desires to either change lenses or to apply the lenses to a different frame the lenses may be readily detached by releasing the retainers and swinging them out, freeing the lenses for separation from the carriers, making it possible for the operator to make any desired selection or switch of frames and lenses, as circumstances require.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. Spectacles including a frame having two like lens carriers joined by a nose piece and bows projecting rearwardly from the carriers, each carrier having a lens receiving opening with a rearwardly facing shoulder, a lens in each carrier opening supported by the shoulder thereof, and a retainer pivotally connected to the rear side of each carrier to be supported thereby and being engageable in the opening thereof, the retainers releasably retaining the lens in the openings, each retainer being a split resilient ring with end portions bearing outwardly in the opening in which the retainer is received.

2. Spectacles including, a frame having two like lens carriers joined by a nose piece and bows hinged to the carriers and projecting rearwardly therefrom, each carrier having a lens opening with a groove in the wall thereof and with a rearwardly facing shoulder forward of the groove, a lens in each carrier seated on the shoulder in the opening thereof, and a lens retainer at the rear of each carrier including a resilient element engaged behind the lens and in the groove of the carrier supporting the lens, the retainer being in the form of a split resilient ring with a shaft portion rotatably carried by a bearing secured to the carrier and with relatively movable curved portions bearing outwardly in the groove.

3. Spectacles including, a frame having two like lens carriers joined by a nose piece and bows hinged to the carriers and projecting rearwardly therefrom, each carrier having a lens opening with a groove in the wall thereof and with a rearwardly facing shoulder forward of the groove, a lens in each carrier seated on the shoulder in the opening thereof, and a lens retainer at each carrier including a resilient element behind the lens and in the groove of the carrier, each resilient element being in the form of a split resilient ring with relatively movable curved portions bearing outwardly in the groove and having free outer ends, rearwardly projecting operating posts on the free ends of said curved portions, and a shaft portion diametrically opposite the posts supporting said curved portions and rotatably carried by bearings secured to the carrier.

4. Spectacles including, a frame having two like lens carriers joined by a nose piece and bows hinged to the carriers and projecting rearwardly therefrom, each carrier having a bearing at the rear thereof and having a lens opening with a groove in the wall thereof and with a rearwardly facing shoulder forward of the groove, a lens in each carrier seated on the shoulder in the opening thereof, and a lens retainer at the rear of each carrier including resilient elements engaged behind the lens and in the groove of the carrier, the retainer being in the form of a split resilient ring with a shaft portion diametrically opposite the split of the ring and rotatably carried by a bearing of the carrier, the ring having diametrically opposite curved portions yieldingly bearing outwardly in the groove.

5. Spectacles including, a frame having two like lens carriers joined by a nose piece and bows hinged to the carriers and projecting rearwardly therefrom, each carrier having a bearing at the rear thereof and a lens opening with a groove in the wall thereof and with a rearwardly facing shoulder forward of the groove, a lens in each carrier seated on the shoulder in the opening thereof, and a lens retainer at each carrier behind the lens carried thereby, each retainer being in the form of a split resilient ring with a shaft portion rotatably carried by the bearing of the carrier at a point substantially diametrically opposite the point where the nose piece joins said carrier, relatively movable curved portions of the ring having outward bearing engagement in the groove.

BEATRICE M. RETZ.

REFERENCES CITED

The following references are of record in the file of this patent:

FOREIGN PATENTS

| Number | Country | Date |
| --- | --- | --- |
| 19,501 | Germany | Sept. 22, 1882 |
| 361,682 | France | Aug. 9, 1906 |
| 773,913 | France | Sept. 10, 1934 |
| 463,000 | Great Britain | Mar. 19, 1937 |
| 509,025 | Great Britain | July 10, 1939 |